(12) United States Patent
Eberle et al.

(10) Patent No.: US 8,242,885 B2
(45) Date of Patent: Aug. 14, 2012

(54) SYSTEM FOR PROVIDING INTERMITTENT COMMUNICATION WITHOUT COMPROMISING A STERILE FIELD

(76) Inventors: Joseph Eberle, Reno, NV (US); Alexander Prokop, Reno, NV (US)

(*) Notice: Subject to any disclaimer, the term of this patent is extended or adjusted under 35 U.S.C. 154(b) by 1235 days.

(21) Appl. No.: 11/895,159

(22) Filed: Aug. 22, 2007

(65) Prior Publication Data
US 2009/0054005 A1 Feb. 26, 2009

(51) Int. Cl.
*B60R 25/00* (2006.01)
(52) U.S. Cl. ........................ 340/5.71; 340/600
(58) Field of Classification Search .......... 340/600, 340/825.72; 709/217
See application file for complete search history.

(56) References Cited

U.S. PATENT DOCUMENTS

| | | | |
|---|---|---|---|
| 5,651,384 A * | 7/1997 | Rudrich | 137/1 |
| 2004/0227484 A1* | 11/2004 | DePasqua | 318/588 |
| 2005/0046584 A1* | 3/2005 | Breed | 340/825.72 |
| 2007/0261153 A1* | 11/2007 | Wise et al. | 2/423 |
| 2008/0220108 A1* | 9/2008 | Maca et al. | 424/778 |

* cited by examiner

*Primary Examiner* — Shirley Lu
(74) *Attorney, Agent, or Firm* — Mark A. Goodman, Esq

(57) ABSTRACT

A system for providing intermittent communication while preserving a sterile area is provided. Sterility is preserved because the user can switch between transmitting and receiving mode without needing to touch a physical button, switch, or dial. The system is particularly valuable to doctors or dentists performing procedures. The system includes a two-way communication device coupled with a sensor, the sensor being capable of detecting the presence of an object, generally the user's hand or an instrumentality of the user, located closer than a predetermined distance from the sensor in a predetermined direction relative to the sensor. Upon such detection, the communication device is switched from receiving to tranmitting mode and remains in transmitting mode until a predetermined amount of time has elapsed since the object has ceased to be located within the predetermined distance in the predetermined direction of the sensor.

9 Claims, 4 Drawing Sheets

SYSTEM FOR PROVIDING INTERMITTENT COMMUNICATION WITHOUT COMPROMISING A STERILE FIELD

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of communications and more specifically to a system for providing intermittent communication without compromising a sterile field.

Intermittent voice communication systems such as two way radios, intercom systems telephones, and cellular telephones are well known and adaptable to numerous professional and personal settings.

An intercom is an electronic communications system within a building or group of buildings. Intercoms are generally composed of fixed microphone and speaker units which connect to a central control panel. A small home intercom might connect a few rooms in a house. Larger systems might connect all of the rooms in a school or hospital to a central office. Intercoms in larger buildings often function as public address systems, capable of broadcasting announcements.

In many schools, tones signaling the change of classes are sounded over the intercom, taking the place of the electromechanical bells used in older schools. Intercom systems can also be found on passenger and rapid transit trains.

A two-way radio is a radio that can both transmit and receive, unlike a broadcast receiver which only receives content one way. A push-to-talk button or some kind of button, switch or dial is often present to activate the transmitter. Hand-held portable two-way radios are often called walkie-talkies or handie-talkies. Two-way radios are available in mobile and stationary base configurations. In two-way radios with headsets, a push-to-talk button may be included on a cord or wireless electronics box clipped to the user's clothing. In an ambulance or aircraft, a button may be present where the corded headset plugs in to the radio wiring. Dispatch consoles often have a hand-operated push-to-talk buttons along with a foot switch or pedal. If the dispatcher's hands are on a computer keyboard, the user can step on the foot pedal to transmit. In some circumstances, voice-operated transmit is used in place of a push-to-talk button.

Especially in the context of an area where sterile technique is important, such as a medical or dental operatory, certain scientific or technical laboratories, or certain industrial plants, each of these existing technologies is deficient in that the user must physically touch some kind of control such as a button, switch, or dial. Having to touch the communication system with the users hand is likely to contaminate the users sterile glove. In fact, it is common for a doctor or dentist to remove and subsequently replace his gloves in order to use the use the intercom or a radio to communicate with a staff member or colleague in another room.

Although the use of a foot pedal or knee board based control would remedy this sterility problem, such technologies have their own inherent deficiencies. By their nature, foot and knee based controls will have a fixed or substantially fixed location. However, the user would likely desire to be able to control the communication device where every he stands. For example, a doctor performing surgery might have to adjust his position several times during the procedure to get the best angle to work on the patient's body. It would be inconvenient for the doctor to have to stretch his leg or adjust his position to turn on the radio. The same is true for a dentist. Also, dentists often perform procedures on multiple patients in different operatory rooms simultaneously, moving from one operatory to another to perform the most critical parts of the procedure while dental assistants are busy with the less difficult tasks during the time the dentist is with another patient. A foot or knee activated control would have to be installed in each operatory to be useful.

Voice activated systems also exist. However, the artificial intelligence technology involved is not yet reliable enough for these purposes especially since the environments at issue contain constant talking among the professionals and staff. It is very difficult under today's technology for a system to reliably tell when, for instance, the dentist intends to speak to the system and not his assistant. Also, such technologies are far more expensive than any type of conventional switch.

BRIEF SUMMARY OF THE INVENTION

The primary object of the invention is to allow a professional working in a sterile area to communicate with others outside of the work area without touching any buttons either before or after the communication is made, thereby allowing such intermittent communication without compromising a sterile field.

A further object of the invention is that the device be adaptable to mount on the user's glasses, safety goggles, a safety shield, clothing, helmet, ear, or other location on the person of the user so that the user will have continual access to the communication device.

Yet another object of the invention is the device is lightweight and small in size.

Still yet another object of the invention is the user can make a short call by sweeping his hand near the sensor briefly and then moving it away.

Another object of the invention is that the user can make a longer call by holding his hand near the sensor for the duration of the call.

Another object of the invention is the user can adjust the preset time of the call.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a system for providing intermittent communication comprising: a two-way communication device coupled with a sensor, the sensor being capable of detecting the presence of an object located closer than a predetermined distance from the sensor in a predetermined direction relative to the sensor, wherein when the object is detected closer than the predetermined distance in the predetermined direction, the two-way communication device is switched from receiving to tranmitting mode and remains in transmitting mode until a predetermined amount of time has elapsed since the object has ceased to be located within the predetermined distance in the predetermined direction of the sensor. Preferably, the sensor is adapted to mount on eyeglasses, safety goggles, safety glasses, safety shields, helmets, clothing, or the ear or other body part. Also preferrably, the communication device would comprise a two-way radio, an intercom system, a telephone, a cellular telephone, or a voice over IP system. Also preferrably, the predetermined distance with which the sensor would be triggered would be between 2 inches and 6 inches. Also, the amount of time the communication would remain in transmitting mode after the object is removed from close proximity to the sensor would be adjustable. Optionally, such adjustment would be between about 3 and about 7 seconds.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 4:
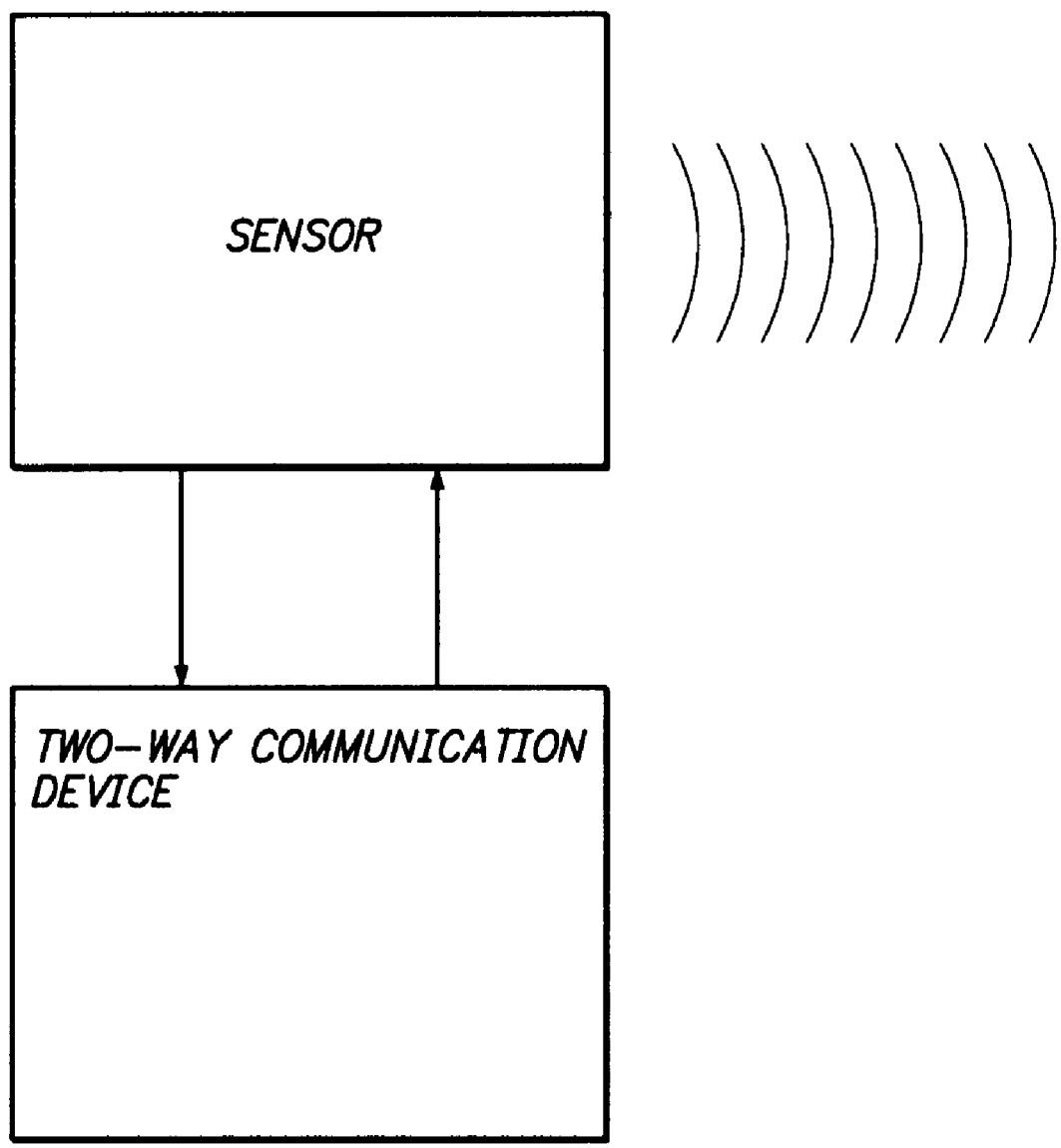
FIG. 4 is a conceptual block diagram of the invention.

A system for providing intermittent communication without having to touch any physical control such as a button, dial, or switch is provided. This system is particularly valuable in that it provides intermittent communication without compromising a sterile field. FIG. 4 broadly illustrates the inventive concepts. The system comprises a two-way communication device coupled with a sensor. In FIG. 4, the two-way communication device and the sensor are represented by labelled boxes. The sensor is capable of detecting the presence of an object located within a predetermined proximity range from the sensor. The predetermined proximity range being defined as closer than a predetermined distance from the sensor in a predetermined direction relative to the sensor. The curved lines in FIG. 4 represent the predetermined proximity range. When the object is detected closer than the predetermined distance in the predetermined direction, the two-way communication device is switched from receiving to tranmitting mode. The two-way communication device then remains in transmitting mode until a predetermined amount of time has elapsed since the object has ceased to be located within the predetermined proximity range, at which point the two-way communication device is switched back from transmitting mode to receiving mode. In most situations the object involved will comprise the hand, other body part, or instrumentality of the user. In a preferred embodiment, the predetermined distance from the sensor would range from about 2 inches to about 6 inches. Also preferrably, the predetermined amount of time would range from about 3 seconds to about 7 seconds.

The system allows the user to activate a call through the two-way communication device by placing his hand or some other object within the predetermined proximity range defined by distance from the sensor in a predetermined direction but without having to physically touch the system. The object triggering the sensor will generally be the hand or instrumentality of the user. When the object enters the predetermined proximity range, the communication device is switched from receiving to transmitting mode. As long as the user's hand (or other object) remains in this range, the communication device remains in transmitting mode until a predetermined amount of time has elapsed since the object is removed. The predetermined amount of time may be made to be adjustable through means that are known to one of ordinary skill in the art. Incidentally, this means that the user could elect to set the predetermined amount of time to zero, so that communication is only open when the hand, instrumentality or other object is present within the predetermined proximity range. However, generally users will want to enable the feature that allows the two-way communication device to remain active for a predetermined period of time after the hand or object has been removed. This allows the user to conveniently make a brief call by passing his hand quickly into and out of the predetermined proximity range, as such a motion would activate communication for the predetermined amount of time.

Preferably the sensor would be adapted to mount on the eyeglasses, safety goggles, safety glasses, safety shields, helmet, clothing, ear, or other location on the person of the user. This would enable the user to have continual access to the communication system even while moving around. The means of mounting a relatively small electronic system onto such items is well-known to those of ordinary skill in the art. In accordance with this embodiment, the system would preferably be battery powered. Optionally, a relatively small battery could be mounted together with the sensor, but the battery could also be connected through one or more wires to the system to reduce the weight that would need to be mounted through means that are known.

The two-way communication device would preferably comprise a two-way radio, an intercom system, a telephone, a cellular telephone, or a voice over IP system, although other types of communication systems would function adequately in accordance with this invention. The term "two-way" as used in reference to the communication device indicates that the communication device can send and receive communication to and from one or more remote locations as contrasted with, for instance, a one-way radio broadcast. This term should not be contrued so as to limit the invention to use with devices where communication is limited to two units or two users. The two-way communication device may allow simultaneously or intermittently communication with multiple parties. As is widely understood by those of ordinary skill in the art, a two-way communication device is capable of switching between "receiving mode" and "transmitting mode". In receiving mode, the two-way communication device is able to able to receive communication from one or more remote locations but is not actively transmitting any communication. Optionally, instead of playing the communication directly, while in receiving mode, the two-way communication device may merely indicate that a communication has arrived through a ring, light, or other indicator. While in transmitting mode, the two-way communication device is actively transmitting and receiving communication to and from one or more remote locations. To furhter illustrate this concept, a standard telephone would be said to be in receiving mode as long as it is plugged in to a phone line because it is available to receive a call at any time. When a phone call has been answered and a phone conversation is taking place, the phone would be said to be in transmitting mode. The two-way communication device may be coupled with the sensor through numerous methods well known to those of ordinary skill in the art. These two elements may be connected directly to each other, connected through a wire, or coupled through commercially available wireless technology. Also, as would be apparent to one of ordinary skill in the art, the voice-receiving component (hereinafter the "microphone") and the voice-playing component (hereinafter the "speaker") may be optionally together connected to each other directly, connected by wires or coupled wirelessly. The speaker my be housed in an earpiece. Either the speaker, the microphone, or both components, together with the sensor or not, may optionally be mounted on the users eyeglasses, safety goggles, safety glasses, safety shields, helmet, hat, or clothing. These components could also be mounted on the ear of the user in a manner that is known, as in BLUETOOTH™ and similar technology.

The effect of the coupling of the sensor and the communication system is that the sensor is able to switch the two-way communication system on and off. This could be accomplished through numerous means known to one of ordinary skill in the art. In a preferred embodiment, the sensor comprises a light-emitting diode coupled with a photo-sensor; wherein the light emitting diode and the photo-sensor are each aimed in the predetermined direction; and wherein the light-emitting diode continually emits a beam of electromagnetic radiation, which may comprise pulsed radiation, and the photo-sensor triggers an electronic switch when the photo-sensor is receiving more than a predetermined level of electromagnetic radiation. Preferably, the the light-emitting diode emits pulsed infrared radiation, as pulsed infrared would be effective in helping the system avoid inappropriately turning on due to ambient indoor light or sunlight. Microwave radiation and ultraviolet radiation, both of which may be pulsed, would also be effective in accordance with the present invention.

In a preferred embodiment, the switching mechanism comprises a commercially available OPIC™, a Light Detector with Built-in Signal Processing Circuit for Light Modulation System, SHARP CORPORATION PRODUCT IS471F, although similar commercially available switching mechanisms would function in accordance with the present invention. The OPIC product consists of a light-detecting element and signal processing circuit integrated onto a signal chip. In general, the switch functions in the following way. When triggered by detection of a sufficient level of electromagnetic radiation in the proper spectrum of wavelengths, the sensor sends a signal through an amplifier to a re-triggerable timer, which is in turn, coupled through a driver to a transistor switch. The transistor switch turns on the two-way communication system. The function of the re-triggerable timer is to provide the proper timing of the switching as discussed above. As long as the signal from the sensor activates the re-triggerable timer, the re-triggerable timer turns the transistor switch on. In addition, the re-triggerable timer will wait for the predetermined amount of time after the sensor ceases to be signaling it to before the re-triggerable timer will cease to signal for the transistor switch to be turned on.

The sensor may optionally comprise an ultrasonic beam emitting element coupled with an ultrasonic sensing element; wherein the ultrasonic beam emitting element and the ultrasonic beam sensing element are each aimed in the predetermined direction; and wherein ultrasonic emitting element continually emits a beam of ultrasonic waves and the ultrasonic emitting element triggers an electronic switch when the photo-sensor is receiving more than a predetermined level of ultrasonic waves. Essentially, this embodiment only differs in that ultrasound is used in place of electromagnetic radiation.

Figure 1:
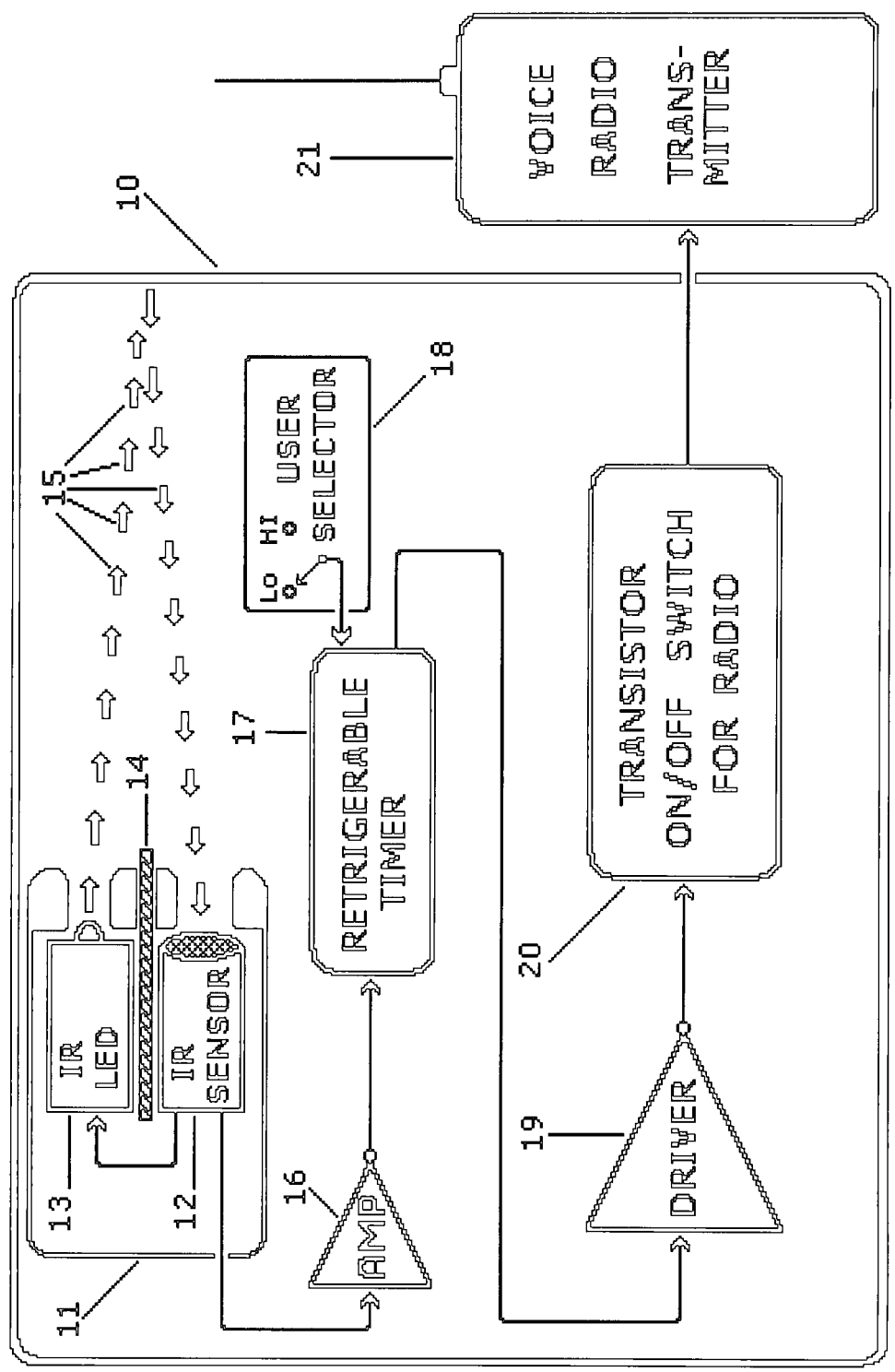
FIG. 1 is a detailed flow-chart describing the operation of the preferred embodiment.

FIG. 1 illustrates the preferred embodiment in more detail. It is a block diagram of a user sensing IR (Infra-Red) device to provide intermittent switched control, of a readily available "off the shelf" voice radio transmitters 21, made according to this invention is shown generally at 10. Device 10 includes an IR section 11, further composed of an IR LED (light emitting diode) 13 and an IR sensor 12. The IR sensor 12 is a four wire plastic semiconductor component. The plastic body of the IR sensor 12 is an integral IR light filter for the internal semiconductor photo detector which only responds to reflected and pulsed IR LED illumination 15 from the IR LED 13. The physical arrangement of the IR sensor 12 is such that only a reflection of the IR LED illumination 15 is able to reach it. The light barrier 14 "a coaxial black tube" guide prevents the IR LED illumination 15 from lighting the IR sensor 12 directly. Pulsed IR LED illumination 15 prevents other office, operating room, etc IR light sources from nuisance activating the voice radio 21 transmitter.

In the presence of an IR light reflection 15 where the IR sensor 12 detects a correct level of IR pulsed light 15. The IR sensor 12 actively lowers to near zero volts "active low" the signal to the amplifier 16. The amplifier 16 signal is inverted and sent to the timer 17 where it resets the timer 17 and triggers the driver 19 which in turn activates "turns on" the transistor 20 acting as an on/off switch for an "incidental to the preferred embodiment" voice radio transmitter 21. In a subsequent absence of a reflected IR light, the IR sensor 12 no-longer detects IR pulsed light and reverts the signal to a "normally high" level to the amplifier 16. A logic high signal at the amplifier 16 lowers the input to the timer 17 which begins to time out in low about 3 seconds or high about 7 seconds depending on the user selector 18 in the preferred embodiment. As the timer 17 completes the timing period the timer 17 delivers a logical low to the driver 19 and causes the transistor 20 to "turn off" demonstrating the re-triggerable timer 17 means and thereby terminating the voice radio 21 transmission.

The block diagram 10 herewith demonstrates a voice radio 21 transmission at the detected start of reflected pulsed IR LED illumination 15 and continued voice radio 21 transmission for a period of time after the said reflected IR LED light 15 is no longer detected.

Figure 2:
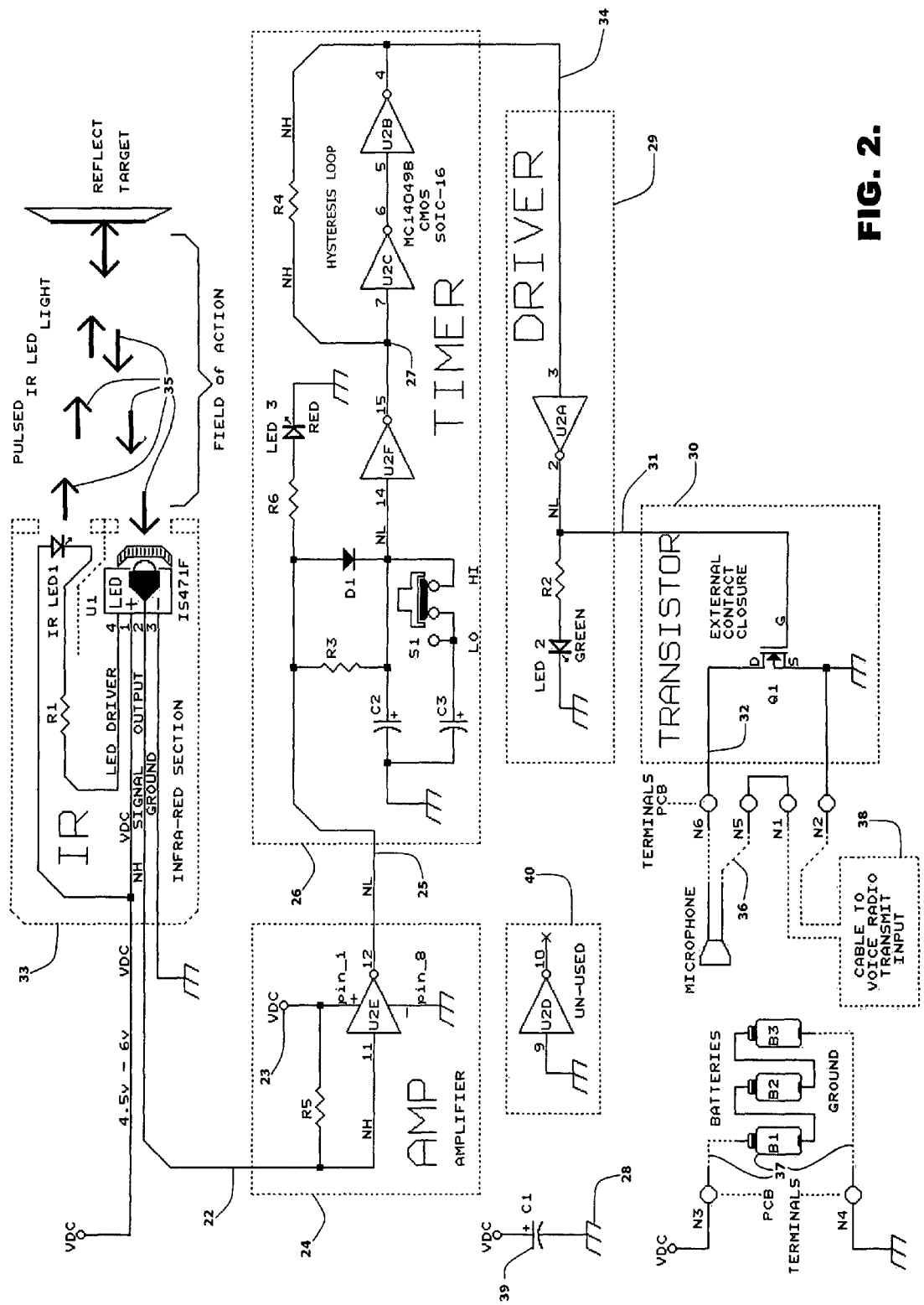
FIG. 2 is a detailed diagram of the complete circuit of the preferred embodiment in schematic form
Figure 3:
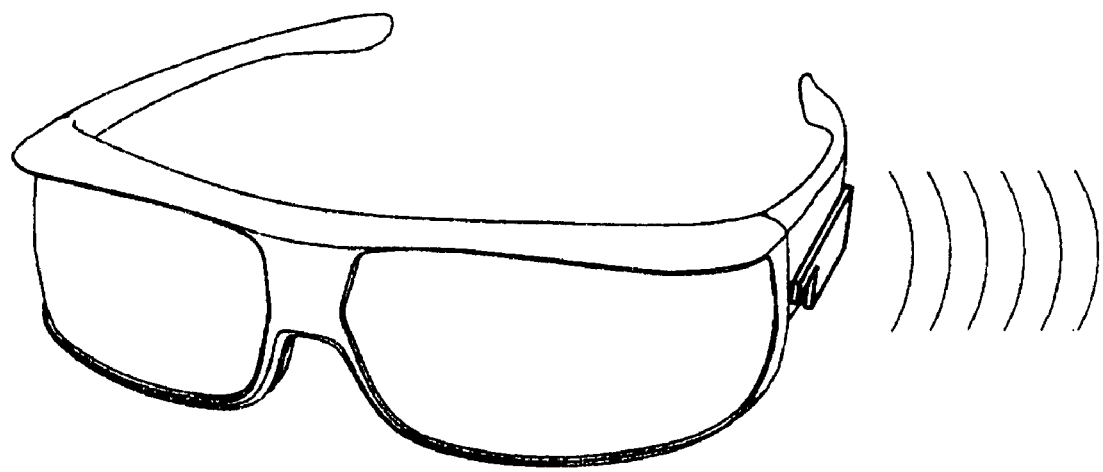
FIG. 3 is a sketch illustrating the embodiment of the invention wherein the system is mounted on safety glasses or eyeglasses.

Turning now to FIG. 2, which shows the complete circuit of this invention in schematic form. In use the IR section 33 produces an invisible field of action 35 generated by the IC (integrated circuit) U1 which continually pulses the LED driver on U1 pin 4 pulling a pulsing current through R1 and LED1 causing LED1 to emit a similarly pulsed IR (infra red) light beam 35. Resistor R5 attached to VDC circuit positive power 23 and the signal line 22 guarantee a NH (normally high) logic condition on said signal line.

In the presence of a correct pulsing IR light reaching sensor U1 the NH (normally high) signal output 22 on U1 pin 2 is pulled down to active low indicating a detected IR reflection. The active low signal 22 enters the amplifier block 24 and the input of an inverting integrated circuit gate U2E pin 11 causing the inverted U2E pin 12 gate output line 25 to generate a logical high. The high on signal line 25 enters the timer block 26 and instantly charges electrolytic capacitor C2 through diode D1. C3 may be also charged depending on the position of switch S1. In this figure the switch S1 is drawn in the HI position and capacitor C3 is also charged by the path, high signal line 25 through D1 and S1 presetting the timer 26 means. LED 3 is lit red by a current from line 25 through R6 through LED 3 to the circuit ground 28, indicating IC U1 has detected an incoming IR light beam 35. Signal line 25 also enters the gate input of U2F pin 14 and exits U2F pin 15 as a low signal. Line 27 presented to the input of a hysteresis loop comprised of CMOS gates U2C, U2B, and feedback resistor R4. This hysteresis loop is used to improve the timer 26 "snap" switching means. The output active low of the timer 26 signal line 34 enters the driver 29 inverting gate U2A pin 3. The output of U2A pin 2 driver 29 is active high and causes the green LED 2 to light from the current flowing from line 31 through R2 through LED 2 to ground 28. The green LED 2 light indicates the radio is in transmitting mode. As the driver 29 output gate is active high the signal line 31 is high entering the transistor block 30 and applying a positive voltage to MOSFET Q1 at its Gate pin. The MOSFET Q1 N-channel assumes a low forward resistance between the Drain pin 32 and grounded Source pin "turns on" when said device receives over 4 volts on the Gate pin. This low resistance is detected by the voice radio transmit input 38 and the radio switches to transmit mode of the users voice over the microphone 36. Demonstrating the beginning of an intermittent communication without compromising (by touch) a sterile field, a purpose of the invention.

When IR light stops reaching sensor U1 then signal line 22 resumes the inactive NH (normally high) signal on U1 pin 2. A high input to the amplifier 24 delivers a low output on signal line 25 to the input of the timer 26. Instantly while capacitors C2 and C3 are still charged the timer 26 output remains active low as before and the green LED 2 is lit and the radio is still transmitting. However the preset timer 26 means begins to discharge the capacitors through R3 to the low signal line 25. Diode D1 is reverse biased and the red LED 3 is off indicating no IR light being detected by sensor U1. After a period of several seconds as determined by the values of R3 and C2, C3 the voltage on the capacitors and the input of U2F pin 14 drops to about one third of VDC, this is when U2F switches and U2F pin 15 goes high on line 27 to the hysteresis loop causing the timer 26 output to go inactive high on line 34 entering the driver 29. A high input to U2A pin 3 produces a low at U2A pin 2 output to line 31 the MOSFET Q1 Gate and the LED 2, R2 circuit path. Both the green LED 2 and Q1 now "turn off" ending radio transmission, entering radio receiving mode. Demonstrating the ending of one intermittent communication cycle without compromising (by touch) a sterile medical field, a purpose of the invention.

Items denoted as 36, 37 and 38 are standard component parts of readily available "off the shelf" voice radios. The unused block 40 of gate U2D pin 9 input is grounded 28 to prevent spurious oscillations and to conserve power. The electrolytic C1 capacitor 39 tied across the positive VDC 23 and ground 28 provides a low impedance PCB "Printed Circuit Board" power source since the voice radio 38 containing the battery 37 source may be connected several feet distant on a small cable.

This invention contains numerous advantages over the current art, although not each advantage is present in every embodiment of the invention. With this system the user does not need to physically touch some kind of control such as a button, switch, or dial. Therefore there is no risk of compromising a sterile field. A doctor or dentist could communicate intermittently with his staff by simply passing his hand close to but not touching the system to open the communication lines. This technology is also applicable to scientific laboratories, industrial plants, or nuclear power plants. Each of these work areas would benefit from intermittent communication without the need to physically touch some kind of control such as a button, switch, or dial. Additionally, the system is optionally adaptable to attach to the clothing, person or instrumentalities of the user so that the intermittent communication is continually availble to the user as he moves about.

While the invention has been described in connection with a preferred embodiment, it is not intended to limit the scope of the invention to the particular form set forth. On the contrary, it is intended to cover such alternatives, modifications, and equivalents as may be included within the spirit and scope of the invention as defined by the appended claims.

What is claimed is:

1. A system for providing intermittent, two-way communication by a user in a sterile field, without threatening the sterile field, comprising:
    a first two-way communication device coupled with a sensor, the sensor and the first two-way communication device being configured to be mounted on the user so as to be portable with the user and located within the sterile field,
    a second two-way communication device being located outside the sterile field, said second two-way communication device being coupled to said first two way communication device;
    said sensor being configured to detect the presence of an object located closer than a predetermined distance from said sensor in a predetermined direction relative to said sensor;
    wherein when said sensor detects an object closer than said predetermined distance in said predetermined direction, said sensor activates a switch, said switch being configured to switch said first two-way communication device from receiving mode to transmitting mode;
    said system further comprising a retrigerable timer coupled to said switch and configured to switch said two-way communication device back to receiving mode automatically after an adjustable, pre-determined elapsed time;
    wherein said two-way communication device remains in transmitting mode until a predetermined amount of time has elapsed since said object has ceased to be located within said predetermined distance in said predetermined direction of said sensor.

2. A system for providing intermittent communication as claimed in claim 1 wherein said two-way communication device comprises a two-way transistor.

3. A system for providing intermittent communication as claimed in claim 1 wherein said predetermined distance from said sensor is between 2 inches and 6 inches.

4. A system for providing intermittent communication as claimed in claim 1 wherein said predetermined amount of time may be adjusted.

5. A system for providing intermittent communication as claimed in claim 1 wherein said predetermined amount of time is between 3 seconds and 7 seconds.

6. A system for providing intermittent communication as claimed in claim 1 wherein said sensor comprises a light-emitting diode coupled with a photo-sensor;
    wherein said light emitting diode and said photo-sensor are each aimed in said predetermined direction; and wherein said light-emitting diode continually emits a beam of electromagnetic radiation and said photo-sensor triggers an electronic switch when said photo-sensor is receiving more than a predetermined level of electromagnetic radiation.

7. A system for providing intermittent communication as claimed in claim 6 wherein said light-emitting diode emits pulsed infrared radiation.

8. A system for providing intermittent communication as claimed in claim 6 wherein said light-emitting diode emits electromagnetic radiation in a wavelength selected from the group consisting of infrared, microwave, and ultraviolet.

9. A system for providing intermittent communication as claimed in claim 1 wherein said sensor comprises an ultrasonic beam emitting element coupled with an ultrasonic sensing element; wherein said ultrasonic beam emitting element and said ultrasonice beam sensing element are each aimed in said predetermined direction;

and wherein ultrasonic emitting element continually emits a beam of ultrasonic waves and said ultrasonic sensing element triggers an electronic switch when said ultrasonic sensing element is receiving more than a predetermined level of ultrasonic waves.

\* \* \* \* \*